United States Patent
Ooka

(10) Patent No.: US 9,050,225 B2
(45) Date of Patent: Jun. 9, 2015

(54) TRAVELING DEVICE

(75) Inventor: Akihiro Ooka, Takashima (JP)

(73) Assignee: TANREN CO., LTD., Takashima (JP)

( * ) Notice: Subject to any disclaimer, the term of this patent is extended or adjusted under 35 U.S.C. 154(b) by 15 days.

(21) Appl. No.: 13/978,630

(22) PCT Filed: Jun. 26, 2012

(86) PCT No.: PCT/JP2012/066223
§ 371 (c)(1),
(2), (4) Date: Jul. 8, 2013

(87) PCT Pub. No.: WO2013/015059
PCT Pub. Date: Jan. 31, 2013

(65) Prior Publication Data
US 2013/0292196 A1 Nov. 7, 2013

(30) Foreign Application Priority Data

Jul. 27, 2011 (JP) .................. 2011-164223

(51) Int. Cl.
*A61G 5/04* (2013.01)
*B62J 1/28* (2006.01)
(Continued)

(52) U.S. Cl.
CPC ... *A61G 5/04* (2013.01); *B62J 1/28* (2013.01); *B62J 25/00* (2013.01); *B62K 17/00* (2013.01);
(Continued)

(58) Field of Classification Search
CPC ..... A61G 7/1038; A61G 7/1096; A61G 5/14; A61G 5/04; A61G 5/042; A61G 7/1048; A61G 7/1051; A61G 7/1094; A61G 7/1098; B62K 3/16; Y10S 180/907; Y10S 297/10; B62J 1/28; B62J 25/00

USPC ........ 280/87.01, 657, 250.1; 180/65.1; 5/87.1
See application file for complete search history.

(56) References Cited

U.S. PATENT DOCUMENTS 5,489,258 A * 2/1996 Wohnsen et al. .................. 602/5
5,520,402 A * 5/1996 Nestor et al. .................. 280/250
(Continued)

FOREIGN PATENT DOCUMENTS

| JP | A-9-238988 | 9/1997 |
| JP | A-2003-126163 | 5/2003 |

(Continued)

OTHER PUBLICATIONS

International Search Report issued in International Patent Application No. PCT/JP2012/066223 dated Sep. 18, 2012.
(Continued)

*Primary Examiner* — Brodie Follman
*Assistant Examiner* — Brian Cassidy
(74) *Attorney, Agent, or Firm* — Oliff PLC

(57) ABSTRACT

A traveling device includes a support body, a columnar section extending upward from the support body, and a middle abutting part provided in a middle of the columnar section. The support body includes a right and left support parts that support the feet of a user. A right-rear abutting part and a left-rear abutting part (a rear-side plate) are provided at rear sides of the right support part and a left support part. A right-middle abutting part (a right elastic member) is provided at one side of the middle abutting part, and a left-middle abutting part (a left elastic member) is provided at the other side thereof. The feet of the user are placed on the right and left support parts such that heels abut against the right-rear and left-rear abutting parts and that patellar ligaments or shin bones abut against the right-middle and left-middle abutting parts.

16 Claims, 15 Drawing Sheets

(51) Int. Cl.
*B62J 25/00* (2006.01)
*B62K 17/00* (2006.01)
*B62K 3/16* (2006.01)
*A61G 7/10* (2006.01)

(52) U.S. Cl.
CPC . *B62K 3/16* (2013.01); *A61G 5/042* (2013.01); *A61G 7/1038* (2013.01); *A61G 7/1048* (2013.01); *A61G 7/1051* (2013.01); *A61G 7/1094* (2013.01); *A61G 7/1096* (2013.01); *A61G 7/1098* (2013.01)

(56) References Cited

U.S. PATENT DOCUMENTS

| | | | | |
|---|---|---|---|---|
| 5,618,055 | A * | 4/1997 | Mulholland | 280/641 |
| 6,270,101 | B1 * | 8/2001 | Hase | 280/250 |
| 6,440,046 | B1 * | 8/2002 | Tholkes | 482/142 |
| 7,036,512 | B2 * | 5/2006 | Harnois | 128/845 |
| 7,614,639 | B2 * | 11/2009 | Tholkes et al. | 280/638 |
| 7,921,485 | B2 * | 4/2011 | Biersteker et al. | 5/83.1 |
| 8,104,835 | B2 * | 1/2012 | Ovre et al. | 297/340 |
| 8,567,808 | B2 * | 10/2013 | Tholkes et al. | 280/638 |
| 2004/0201191 | A1 * | 10/2004 | Jacques et al. | 280/87.01 |
| 2011/0083266 | A1 * | 4/2011 | Herron | 5/83.1 |
| 2012/0255118 | A1 * | 10/2012 | Hammond et al. | 5/86.1 |

FOREIGN PATENT DOCUMENTS

| | | |
|---|---|---|
| JP | A-2008-228904 | 10/2008 |
| JP | A-2011-218847 | 11/2011 |
| WO | WO 2010/140560 A1 | 12/2010 |

OTHER PUBLICATIONS

Written Opinion of the international Searching Authority issued in International Patent Application No. PCT/JP2012/066223 dated Sep. 18, 2012 (w/ translation).

Japanese Office Action issued in Japanese Patent Application No. 2012-549030 dated Jan. 10, 2013 (w/ translation).

Jan. 28, 2014 Translation of International Preliminary Report on Patentability issued in International Application No. PCT/JP2012/066223.

* cited by examiner

TRAVELING DEVICE

TECHNICAL FIELD

The present invention relates to a traveling, device used far moving on a ground surface, a floor surface, or the like.

BACKGROUND

There has been proposed a traveling device enabling a user to travel standing up by shifting weight (see Patent Document 1, for example). This traveling device includes a frame with a center wheel freely rotatably provided at about the center thereof, a front wheel freely rotatably provided at the front thereof, and a rear wheel freely rotatably provided at the rear thereof. The center wheel is formed with larger diameter than the front and rear wheels. Also, right and left decks are provided at about the center of the frame, and right and left grips are provided at the front of the frame.

In use, a user travels by shifting weight back and forth with right and left feet on the right and left decks while gripping the right and left grips with right and left hands. That is, the user shifts the body weight to the front to change a state in which the center and rear wheels contact the ground surface (maintaining the front wheel in a floating state) to a state in which the front and center wheels contact the ground surface (maintaining the rear wheel in a floating state). Shifting the body weight in this manner generates a force in the forward direction to rotate the front and center wheels in the forward direction, moving the frame with the user in the forward direction.

Patent Document 1: Japanese Patent Application Publication No. 2008-228904

SUMMARY OF THE INVENTION

Problems to be Solved by the Invention

However, this type of traveling device has the following problem. That is, since the user holds the user's body with the right and left feet on the right and left decks and right and left hands gripping the right and left grips, the user cannot hold the user's body in a stable manner. It is difficult for a person with weak legs, for example, to hold his/her body, making difficult to use this type of traveling device.

It is an object of the present invention to provide a traveling device with which even a person with weak legs can travel standing up while stably holding his/her body.

Means for Solving the Problems

A traveling device according to the disclosure includes a support body, a columnar section extending upward from the support body, and a middle abutting part provided in a middle of the columnar section. The support body includes a right support part that supports a right foot of a user and a left support part that supports a left foot of the user. The right support part is provided with a right-rear abutting part at a rear part thereof, and the left support part being provided with a left-rear abutting part at a rear part thereof. The middle abutting part extends in a horizontal direction and provided with a right-middle abutting part at one side and a left-middle abutting part at the other side. In use, the user places the right foot on the right support part such that a right heel abuts against the right-rear abutting part and that a patellar ligament or a shin bone of a right leg abuts against the right-middle abutting part, and places the left foot on the left support part such that a left heel abuts against the left-rear abutting part and that a patellar ligament or a shin bone of a left leg abuts against the left-middle abutting part.

In at least one aspect of the disclosure, the right-middle abutting part is provided with a right elastic member. The left-middle abutting part is provided with a left elastic member. In use, the patellar ligament or the shin bone of the right leg of the user abuts against the right elastic member, and the patellar ligament or the shin bone of the left leg abuts against the left elastic member.

In at least one aspect of the disclosure, a middle elastic member is provided between the right elastic member and the left elastic member. In use, a right knee of the user abuts against a right side of the middle elastic member, and a left knee abuts against a left side of the middle elastic member.

In at least one aspect of the disclosure, the right support part is provided with a right-outer abutting part; the left support part is provided with a left-outer abutting part. In use, an outer side of the right foot of the user abuts against the right-outer abutting part, and an outer side of the left foot abuts against the left-outer abutting part.

In at least one aspect of the disclosure, a front wheel means is provided at a front side of the support body, and a rear wheel means is provided at a rear side of the support body.

In at least one aspect of the disclosure, a gripping section is provided at an upper part of the columnar section. The gripping section has a horizontal gripping part fixed to the columnar section and extending in the horizontal direction. The horizontal gripping part is provided with a right gripping part at one side and a left gripping part at the other side. In use, the user grips the right gripping part with a right hand and the left gripping part with a left hand.

In at least one aspect of the disclosure, a support belt is detachably attached between both sides of the gripping section, and the support belt supports buttocks of the user.

In at least one aspect of the disclosure, the front wheel means and the rear wheel means are positioned slightly higher than a bottom surface of the support body. In a standstill state, the bottom surface of the support body contacts the ground, and the front wheel means and the rear wheel means are maintained in a floating state. When the right gripping part and the left gripping part are gripped and pushed forward in the standstill state, then the support body floats upward about the front wheel means, moving the support body forward. When the right gripping part and the left gripping part are gripped and pulled rearward in the standstill state, then the support body floats upward about the rear wheel means, moving the support body rearward.

In at least one aspect of the disclosure, the front wheel means and the rear wheel means are freely movable between a traveling position to contact the ground and a non-traveling position shifted upward from the traveling position. In a standstill state, the front wheel means and the rear wheel means are maintained at the non-traveling position, and the bottom surface of the support body contacts the ground, and the front wheel means and the rear wheel means are maintained in the floating state. In a traveling state, the front wheel means and the rear wheel means are maintained at the traveling position, and the front wheel means and the rear wheel means contact the ground, and the support body is maintained in the floating state.

In at least one aspect of the disclosure, the columnar section includes a right columnar section and a left columnar section, and a space is defined at a position above the middle abutting part by the middle abutting part and upper parts of the right columnar section and the left columnar section.

In at least one aspect of the disclosure, a right gripping member is provided at an upper part of the right columnar section, and a left gripping member is provided at an upper part of the left columnar section. The right gripping member includes a right-horizontal part fixed to the right columnar section and extending in the horizontal direction and a right gripping part extending upward toward the front at a slant from the right-horizontal part. The left gripping member includes a left-horizontal part fixed to the left columnar section and extending in the horizontal direction and a left gripping part extending upward toward the front at a slant from the left-horizontal part. In use, the user grips the right gripping part with a right hand and the left gripping part with a left hand.

In at least one aspect of the disclosure, a front wheel means is provided at a front part of the support body, and a rear wheel means is provided at a rear part of the support body. In a standstill state, the front wheel means, the rear wheel means, and a bottom surface of the support body contact the ground. When the right gripping part and the left gripping part are gripped and pushed forward in the standstill state, the support body and the rear wheel means float upward about the front wheel means, moving the support body forward. When the right gripping part and the left gripping part are gripped and pulled rearward in a standstill state, the support body and the front wheel means float upward about the rear wheel means, moving the support body rearward.

In at least one aspect of the disclosure, a front wheel means is provided at a front part of the support body, and a rear wheel means is provided at a rear part of the support body. The front wheel means and the rear wheel means are at positions slightly higher than the bottom surface of the support body. In a standstill state, the bottom surface of the support body contacts the ground, and the front wheel means and the rear wheel means are maintained in a floating state. When the right gripping part and the left gripping part are gripped and pushed forward in the standstill state, the support body floats upward about the front wheel means, moving the support body forward. When the right gripping part and the left gripping part are gripped and pulled rearward in the standstill state, the support body floats upward about the rear wheel means, moving the support body rearward.

In at least one aspect of the disclosure, a support belt is detachably attached to the right gripping part and the left gripping part, and the support belt supports buttocks of the user.

In at least one aspect of the disclosure, an electric motor is provided in relation to any of the front wheel means and the rear wheel means, and a bottom surface of the support body is positioned slightly higher than the front wheel means and the rear wheel means. The support body moves forward when any of the front wheel means and the rear wheel means is driven to rotate in a predetermined direction by the electric motor. The support body moves rearward when any of the front wheel means and the rear wheel means is driven to rotate in a reverse direction by the electric motor.

In at least one aspect of the disclosure, the traveling device further includes an operation means used for controlling the electric motor, a right gripping part that is gripped with a right hand of the user, and a left gripping part that is gripped with a left hand of the user. The operation means is provided at the right gripping part or the left gripping part and operated by the user.

Effects of the Invention

According to at least one aspect of the disclosure, the support body includes the right support part and the left support part. The right-rear abutting part and the left-rear abutting part are provided at the rear part of the right support part and the left support part. The right-middle abutting part and the left-middle abutting part are provided to the middle abutting part. Thus, in use, the right foot of the user is placed on the right support part such that the right heel abuts against the right-rear abutting part and that the patellar ligament or the shin bone of the right leg abuts against the right-middle abutting part, and the left foot is placed on the left support part such that the left heel abuts against the left-rear abutting part and that the patellar ligament or the shin bone of the left leg abuts against the left-middle abutting part. By doing so, even a person with weak legs can support his/her body stably with both heels and the patellar ligaments or the shin bones of both legs.

Also, according to at least one aspect of the disclosure, the right elastic member is provided to the right-middle abutting part, and the left elastic member is provided to the left-middle abutting part. Thus, in use, the patellar ligament or the shin bone of the right leg abuts against the right elastic member, and the patellar ligament or the shin bone of the left leg abuts against the left elastic member. This makes it possible to stably support the body without feeling pain due to abutment.

Also, according to at least one aspect of the disclosure, the middle elastic member is provided between the right elastic member and the left elastic member. In use, the right knee abuts against the right side of the middle elastic member, and the left knee abuts against the left side of the middle elastic member. This makes it possible to make the right and left knees further stable, thereby further stabilizing the state of the right and left legs.

Also, according to at least one aspect of the disclosure, the right-outer abutting part is provided to the right support part, and the left-outer abutting part is provided with the left support part. In use, the outer side of the right foot abuts against the right-outer abutting part, and the outer side of the left foot abuts against the left-outer abutting part. By doing so, it is possible to place feet (parts below the heels) on the right support part and the left support part further stably.

Also, according to at least one aspect of the disclosure, the front wheel means is provided at the front side of the support body, and the rear wheel means is provided at the rear side thereof. Thus, it is possible to travel by using the front wheel means and the rear wheel means.

Also, according to at least one aspect of the disclosure, the gripping section is provided at the upper part of the columnar section, and the horizontal gripping part of the gripping section is provided with the right gripping part at one side and the left gripping part at the other side. Thus, in use, by gripping the right gripping part with the right hand and the left gripping part with the left hand, even a person with weak legs can stably support the body standing up.

Also, according to at least one aspect of the disclosure, the support belt is detachably attached between both sides of the gripping section. Thus, it is possible to the support buttocks of a user, enabling the user to keep standing stably even after disengaging the hands from the right gripping part and the left gripping part.

Also, according to at least one aspect of the disclosure, in the standstill state, the bottom surface of the support body contacts the ground, and the front wheel means and the rear wheel means are maintained in a floating state. Thus, the support body can be maintained in a resting state. Also, when the right gripping part and the left gripping part are gripped and pushed forward in the standstill state, then the support body floats upward about the front wheel means, making it possible to move the support body forward using the front wheel means. Also, when the right gripping part and the left gripping part are gripped and pulled rearward in the standstill state, then the support body floats upward about the rear wheel means, making it possible to move the support body rearward with the rear wheel means.

Further, according to at least one aspect of the disclosure, in the standstill state, the front wheel means and the rear wheel means are maintained at the non-traveling position, and the bottom surface of the support body contacts the ground, and the front wheel means and the rear wheel means are maintained in the floating state. Thus, the support body can be maintained in the resting state. Also, in the traveling state, the front wheel means and the rear wheel means are maintained at the traveling position, and the front wheel means and the rear wheel means contact the ground, and the support body is maintained in the floating state. Thus, it is possible to move the support body with the front wheel means and the rear wheel means.

Also, according to at least one aspect of the disclosure, the space is defined at a position above the middle abutting part. Thus, it is possible to prevent the upper body of the user from contacting parts of the traveling device when, for example, the user moves forward using the traveling device.

Also, according to at least one aspect of the disclosure, the right gripping member having the right gripping part is provided at the upper part of the right columnar section, and the left gripping member having the left gripping part is provided at the upper part of the left columnar section. In use, the user grips the right gripping part with the right hand and the left gripping part with the left hand. By doing so, even a person with weak legs can stably support his/her body standing up.

Also, according to at least one aspect of the disclosure, the bottom surface of the support body, the front wheel means, and the rear wheel means are maintained in contact with the ground in the standstill state. Thus, the support body can be maintained in the resting state. Also, when the right gripping part and the left gripping part are gripped and pushed forward in the standstill state, the support body and the rear wheel means float upward about the front wheel means, making it possible to move the support body forward with the front wheel means. Also, when the right gripping part and the left gripping part are gripped and pulled rearward in the standstill state, the support body and the front wheel means float upward about the rear wheel means, making it possible to move the support body rearward with the rear wheel means.

Also, according to at least one aspect of the disclosure, in the standstill state, the bottom surface of the support body contacts the ground, and the front wheel means and the rear wheel means are maintained in the floating state. Thus, the support body can be maintained in the resting state. Also, when the right gripping part and the left gripping part are gripped and pushed forward in the standstill state, the support body floats upward about the front wheel means, making it possible to move the support body forward with the front wheel means. Also, when the right gripping part and the left gripping part are gripped and pulled rearward in the standstill state, then the support body floats upward about the rear wheel means, making it possible to move the support body rearward with the rear wheel means.

Also, according to at least one aspect of the disclosure, because the support belt is detachably attached to the right gripping member and the left gripping member, it is possible to support buttocks of the user with the support belt. This makes it possible for the user to keep standing stably even after disengaging the hands from the right gripping part and the left gripping part.

Also, according to at least one aspect of the disclosure, the front wheel means and the rear wheel means are driven in the predetermined direction or the reverse direction by driving force from the electric motor. Thus, it is possible to move the support body forward or rearward without using the pushing force or pulling force of the user.

Also, according to at least one aspect of the disclosure, the operation means for controlling the electric motor is provided at the right gripping part or the left gripping part. Thus, the user can operate the operation means while gripping the right gripping part and the left gripping part.

EMBODIMENTS

First Embodiment

Figure 1:
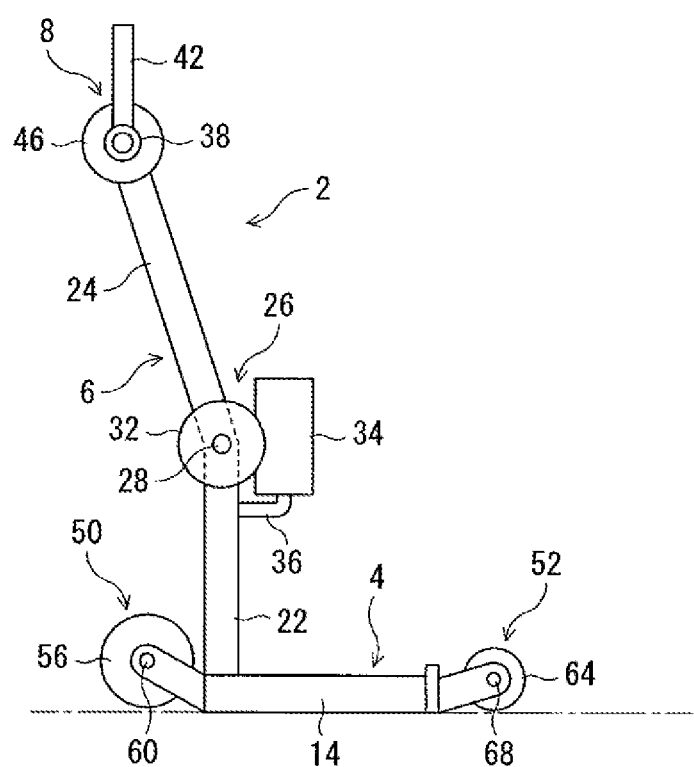
FIG. 1 is a side view of a traveling device according to a first embodiment of the present invention.
Figure 2:
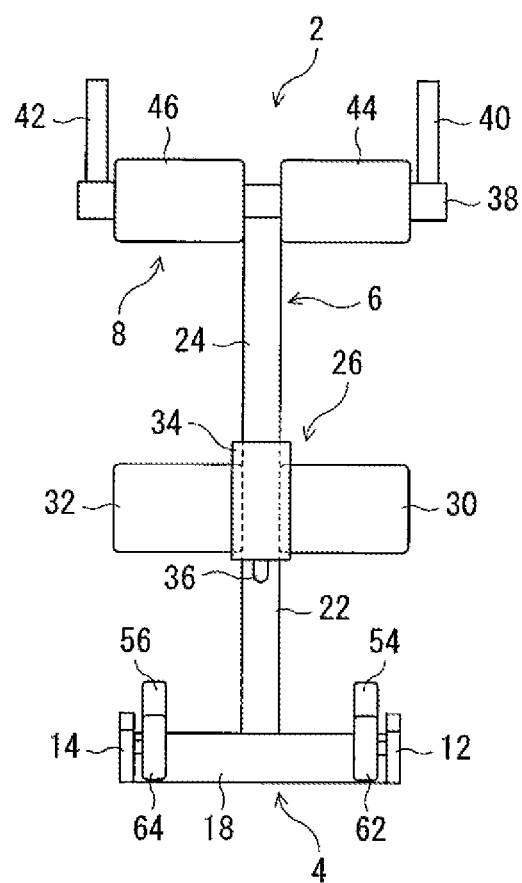
FIG. 2 is a rear view of the traveling device of FIG. 1, viewing the same from the rear.
Figure 3:
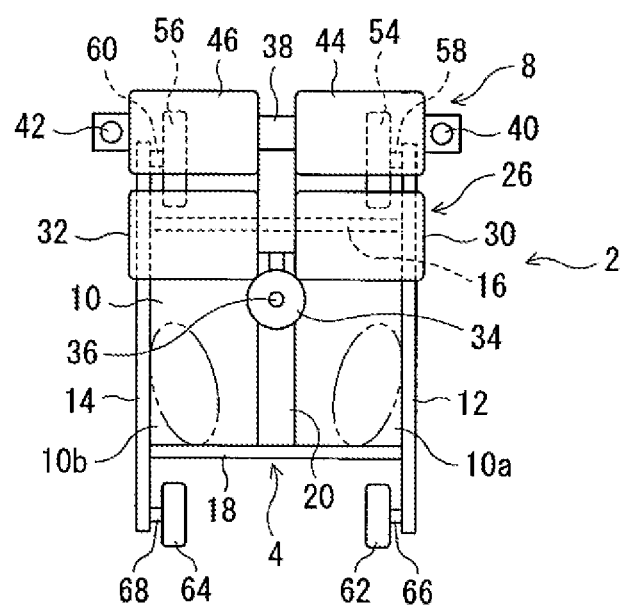
FIG. 3 is a plan view of the traveling device of FIG. 1, viewing the same from the top.

Next, a traveling device according to a first embodiment of the present invention will be described with reference to the accompanying drawings. Referring to FIGS. 1 to 3, a traveling device 2 shown in the drawings includes a support body 4, a columnar section 6 extending upward from the support body 4, and a gripping section 8 provided to an upper part of the columnar section 6. The support body 4 includes a base plate 10. A right-side plate 12 is provided at a right side (right side in FIGS. 2 and 3) of the base plate 10, and a left-side plate 14 is provided at a left side (left side in FIGS. 2 and 3) of the base plate 10. Also, a front reinforcing member 16 is provided between the right-side plate 12 and the left-side plate 14 at a front part of the base plate 10. Further, a rear-side plate 18 is provided at a rear part of the base plate 10. A middle reinforcing member 20 is provided between the rear-side plate 18 and the front reinforcing member 16 at the center of the base plate 10 in a width direction (a direction perpendicular to the sheet surface of FIG. 1, a right-left direction in FIGS. 2 and 3).

With this configuration, a right part 10a of the base plate 10 (i.e., a section surrounded by the right-side plate 12, the front reinforcing member 16, the middle reinforcing member 20, and the rear-side plate 18) serves as a right support part. The right-side plate 12 of the right support part serves as a right-outer abutting part, and the rear-side plate 18 of the right support part serves as a right-rear abutting part. Also, a left part 10b of the base plate 10 (i.e., a section surrounded by the left-side plate 14, the front reinforcing member 16, the middle reinforcing member 20, and the rear-side plate 18) serves as a left support part. The left-side plate 14 of the left support part serves as a left-outer abutting part, and the rear-side plate 18 of the left support part serves as a left-rear abutting part. Note that the right-rear abutting part and the left-rear abutting part may be provided adjustable in the front-rear direction (a right-left direction in FIG. 1, a direction perpendicular to the sheet surface of FIG. 2, an up-down direction in FIG. 3) on an upper surface of the base plate 10. Also, the right-outer abutting part and the left-outer abutting part may be provided adjustable in the width direction (the direction perpendicular to the sheet surface of FIG. 1, the right-left direction in FIGS. 2 and 3) on the upper surface of the base plate 10 for exclusive use.

The columnar section 6 is provided at the widthwise center of the front part of the support body 4 (at the front part of the middle reinforcing member 20 in this embodiment). The columnar section 6 includes a lower columnar part 22 that extends substantially upward in the vertical direction and an upper columnar part 24 that extends further upward from an upper part of the lower columnar part 22. The upper columnar part 24 extends upward toward the front (left in FIG. 1) in a linear fashion.

The columnar section 6 is provided with a middle abutting part 26. In this embodiment, a middle shaft member 28 extending in the horizontal direction is provided to penetrate through the upper part of the lower columnar part 22 of the columnar section 6. One side of the middle shaft member 28 (specifically, a part extending rightward from the columnar section 6) serves as a right-middle abutting part, and the other side (specifically, a part extending leftward from the columnar section 6) serves as a left-middle abutting part. In this embodiment, the middle shaft member 28 is covered with a cylindrical right elastic member 30 at one side and with a cylindrical left elastic member 32 at the other side.

Further, in this embodiment, a middle elastic member 34 is disposed between the right elastic member 30 and the left elastic member 32. The middle elastic member 34 is formed cylindrical. A substantially L-shaped support-shaft part 36 is provided at the axial middle of the lower columnar part 22, and the middle elastic member 34 is mounted on an upright part of the support-shaft part 36. The right elastic member 30, the left elastic member 32, and the middle elastic member 34 may be formed other than cylindrical, such as quadrangular prism, hexagonal prism, elliptic cylinder, or any other suitable shape.

Also, the gripping section 8 has a horizontal gripping part 38 fixed at the upper part of the columnar section 6 and extending in the horizontal direction. A right gripping part 40 is provided at one end (right end in FIGS. 2 and 3) of the horizontal gripping part 38, and a left gripping part 42 is provided at the other end (left end in FIGS. 2 and 3) thereof. The right gripping part 40 and the left gripping part 42 are formed from hollow cylindrical members and extend substantially upward in the vertical direction from the horizontal gripping part 38 as shown in FIG. 1.

In this embodiment, a cylindrical right auxiliary elastic member 44 is provided to cover the middle of one side of the horizontal gripping part 38, and a cylindrical left auxiliary elastic member 46 is provided to cover the middle of the other side thereof. The right auxiliary elastic member 44 and the left auxiliary elastic member 46 are for preventing the user's body from directly contacting the horizontal gripping part 38, and the right auxiliary elastic member 44 and the left auxiliary elastic member 46 may be dispensed with if there is no danger that the user's body will contact the same.

Further, in this embodiment, a front wheel means 50 is provided at the front of the support body 4, and a rear wheel means 52 is provided at the rear thereof. The front wheel means 50 includes right and left front wheels 54 and 56. The right front wheel 54 is rotatably supported inner side of the front part of the right-side plate 12 through a support shaft 58, and the left front wheel 56 is rotatably supported inner side of the front part of the left-side plate 14 through a support shaft 60. Also, the rear wheel means 52 includes right and left rear wheels 62 and 64. The right rear wheel 62 is rotatably supported inner side of the right-side plate 12 through a support shaft 66, and the left rear wheel 64 is rotatably supported inner side of the left-side plate 14 through a support shaft 68. In this embodiment, as shown in FIGS. 1 to 3, outer diameters of the right and left front wheels 54 and 56 are formed larger than outer diameters of the right and left rear wheels 62 and 64. This configuration stabilizes the forward movement of the support body 4 as described later.

In this embodiment, the relationship between the support body 4 and the front wheel means 50 (the right and left front wheels 54 and 56) and the rear wheel means 52 (the right and left rear wheel 62 and 64) is set as follows. In a normal standstill state, as shown in FIG. 1 (also shown in FIGS. 4 and 5), a bottom part of the support body 4 (i.e., a bottom surface of the base plate 10) contacts the ground (a floor surface if indoors or a ground surface if outdoors), and the front wheel means 50 and the rear wheel means 52 float slightly off the floor surface, the ground surface, or the like. The support body 4 contacts the ground and maintained in a resting state.

Figure 4:
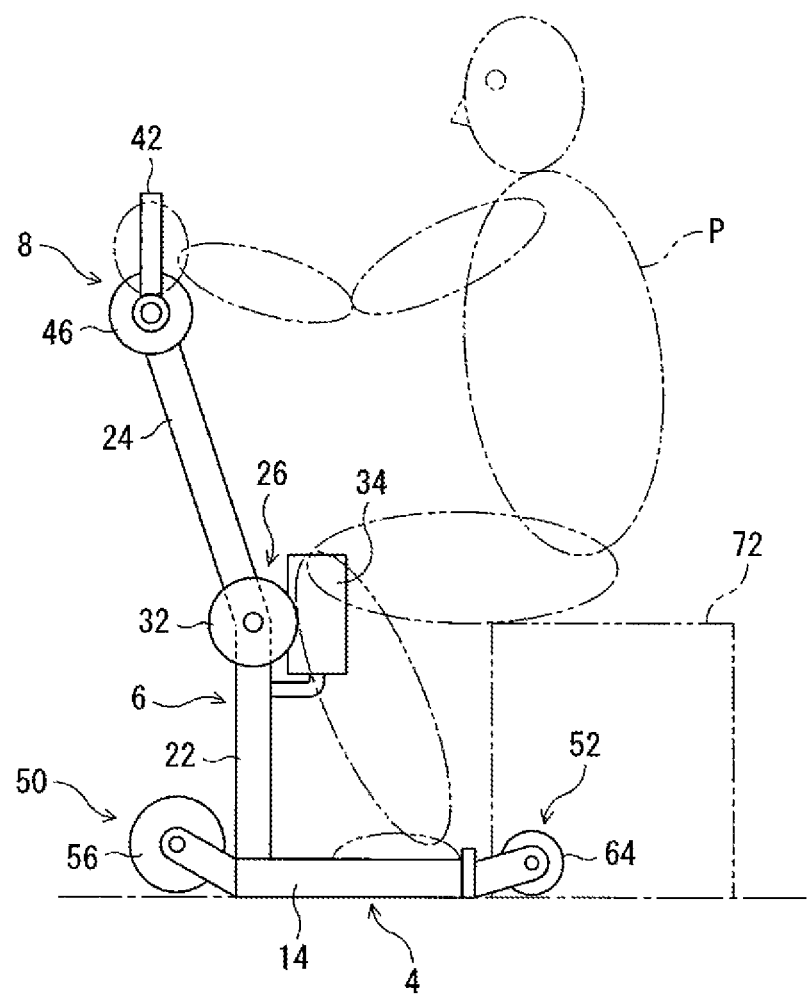
FIG. 4 is an explanatory diagram explaining a state of a user using the traveling device of FIG. 1.

The traveling device 2 described above may be used as follows, for example. Referring mainly to FIGS. 4 to 7, in order for a person with weak legs to ride on the traveling device 2, as shown in FIG. 4, the person first places right and left feet on the right support part (the right part 10a of the base plate 10) and the left support part (the left part 10b of the base plate 10) of the support body 4 while sitting on a chair 72 or the like. Specifically, the right foot of a user P is positioned such that its heel abuts against the right-rear abutting part of the right support part (the rear-side plate 18) and that an outer side of the right foot abuts against the right-outer abutting part (the right-side plate 12). Also, the left foot of the user P is placed such that its heel abuts against the left-rear abutting part of the left support part (the rear-side plate 18) and that an outer side of the left foot abuts against the left-outer abutting part (the left-side plate 14).

Next, in this condition, the user P makes patellar ligaments or shin bones of right and left legs abut against the middle abutting part 26 and right and left knees against the middle elastic member 34. In this embodiment, the patellar ligament or shin bone of the right leg is placed to abut against the right elastic member 30, and the patellar ligament or shin bone of the left leg is placed to abut against the left elastic member 32. At this time, the right knee is maintained in abutment with the right side of the middle elastic member 34, and the left knee is maintained in abutment with the left side of the middle elastic member 34.

In this condition, rearward movement the right and left heels is restricted by the right-rear abutting part and the left-rear abutting part, and forward movement of the patellar ligaments or the shin bones of the right and left legs is restricted by the right elastic member 30 and the left elastic member 32, so even the user P With weak legs can stably support the user's body standing up. In this embodiment, outward movement of the outer sides of the right and left feet is restricted by the right-outer abutting part and the left-outer abutting part, making it possible to place the right and left feet on the right support part and the left support part stably. In addition, because the right and left knees are supported in abutment with the middle elastic member 34 from both sides, parts below the right and left knees are highly stable even in a standing position.

Figure 5:
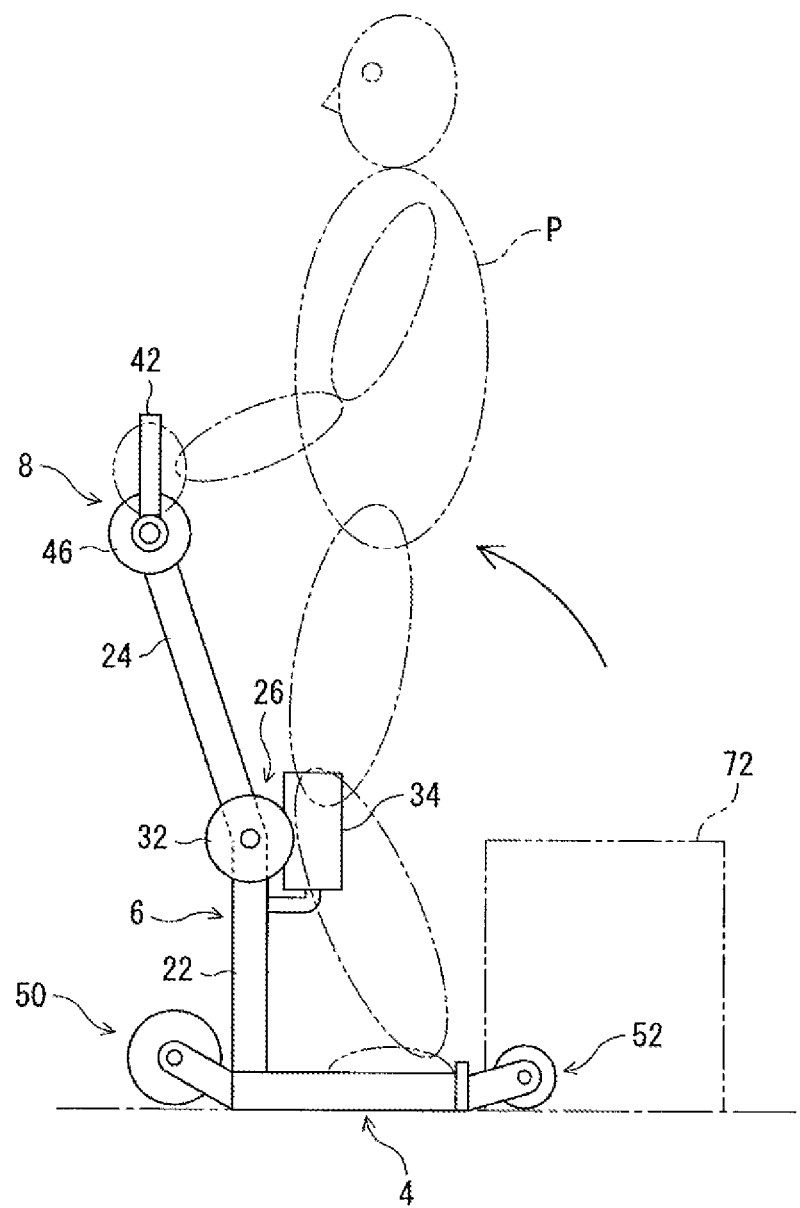
FIG. 5 is an explanatory diagram explaining a standing position of the user using the traveling device of FIG. 1.

While both leas are supported in this manner the user grips the gripping section 8 with both hands. That is, the user grips the right gripping part 40 with the right hand and the left gripping part 42 with the left hand. Then, while gripping in this manner, as shown in FIG. 5, the user lifts up the user's body using arm strength and stands up. When standing in this manner, as will be understood from the above description, rearward movement of the right and left heels is restricted by the right-rear abutting part and the left-rear abutting part, and forward movement of the patellar ligaments or the shin bones of the right and left legs is restricted by the right elastic member 30 and the left elastic member 32. Restricting in this manner enables even a user P with weak legs to keep standing stably. In this embodiment, outward movement of the outer sides of the right and left feet is restricted by the right-outer abutting part and the left-outer abutting part, so the right and left feet can be maintained supported on the right support part and the left support part stably. In addition, because the right and left knees are supported in abutment with the middle elastic member 34 from the both sides, parts below the right and left knees are highly stable even in a standing position. Thus, adopting the configuration of the traveling device 2 enables even the user P with weak legs to easily stand up and maintain the standing position.

Figure 6:
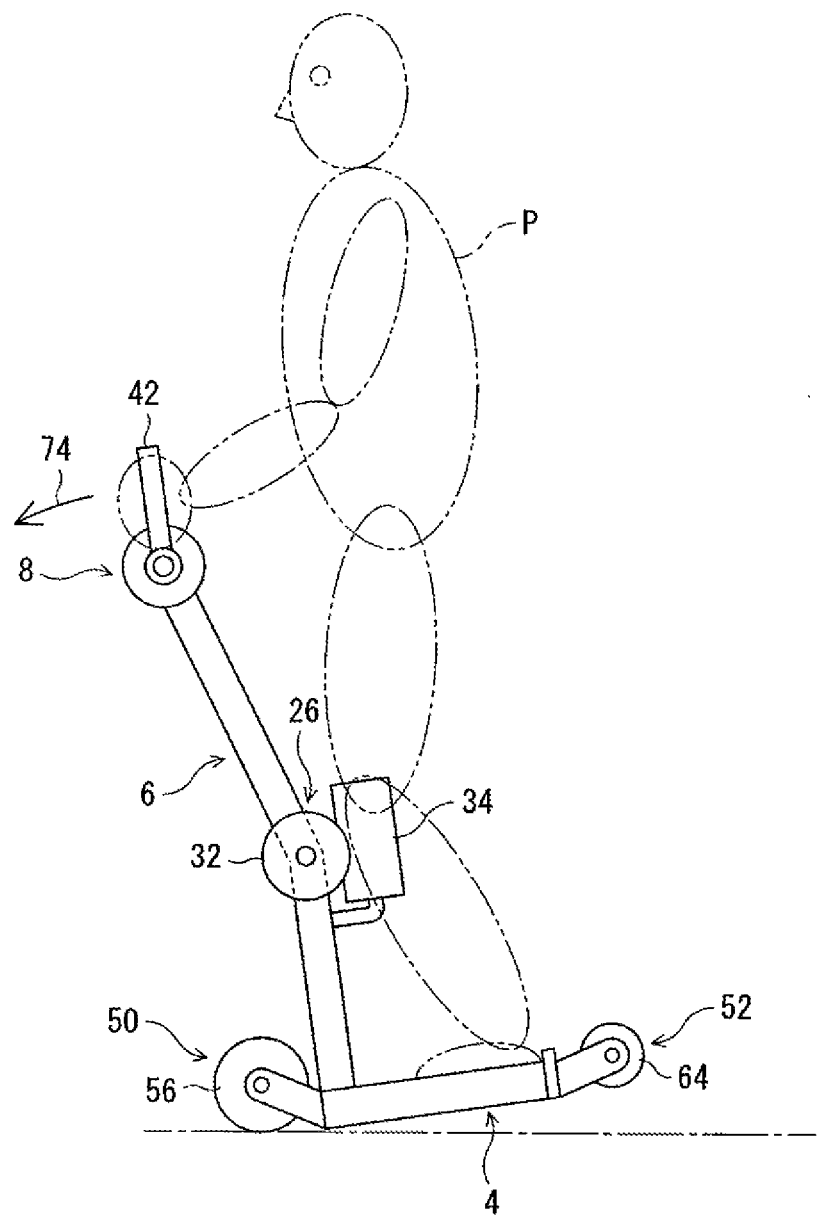
FIG. 6 is an explanatory diagram explaining a state when traveling forward with the traveling device of FIG. 1.

In order to move forward using the traveling device 2, the user grips and pushes forward the right gripping part 40 and the left gripping part 42 as indicated by an arrow 74. In the normal standstill state (resting state), the bottom surface of the support body 4 (the bottom surface of the base plate 10) contacts the ground, and the front wheels 54 and 56 of the front wheel means 50 and the rear wheels 62 and 64 of the rear wheel means 52 are maintained in a floating state. Thus, it is at a stop in a highly stable state. Pushing forward in this manner, however, as shown in FIG. 6, the support body 4 floats upward with the right front wheel 54 and the left front wheel 56 of the front wheel means 50 as pivot points, so a force that pushes forward moves the support body 4 forward, moving the traveling device 2 forward.

At this time, because the body weight of the user P acts on a part rear of the front wheel means 50, the support body 4 is returned to its initial state by the body weight of the user P. Thus, the traveling device 2 returns to its initial state, becoming the standstill state, after slightly moving forward. Thus, each time the user P pushes forward, the user P can move forward a little, feeling safe.

Figure 7:
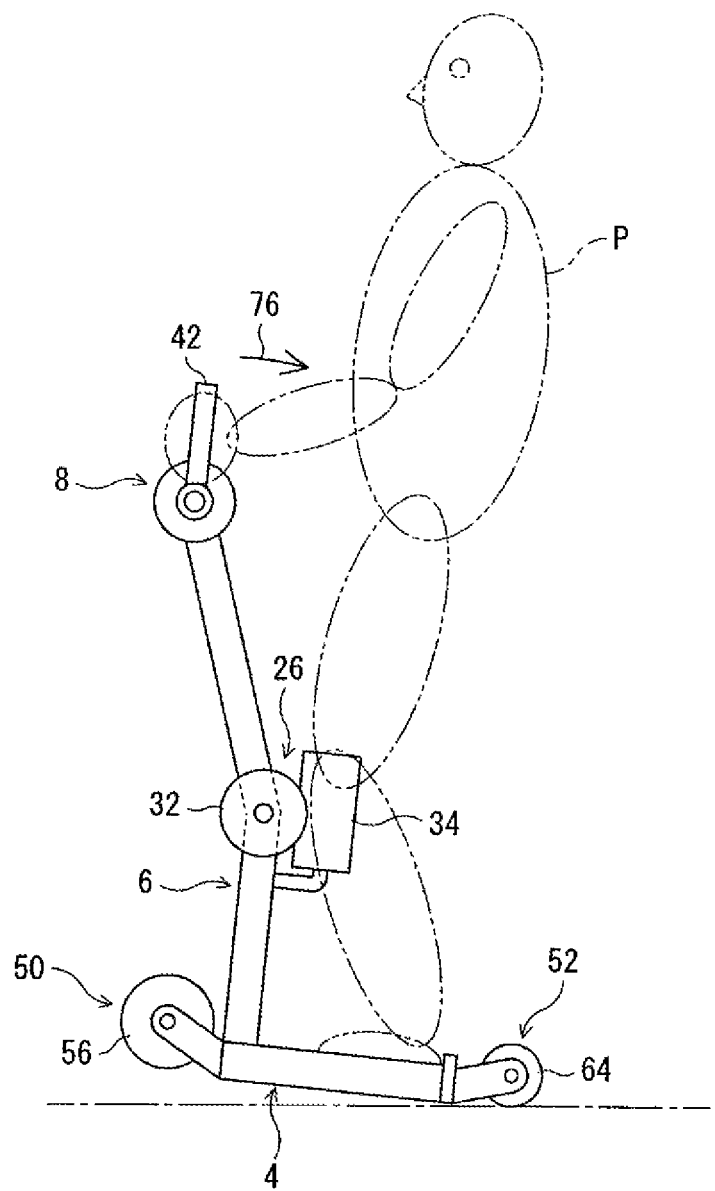
FIG. 7 is an explanatory diagram explaining a state when traveling rearward with the traveling device of FIG. 1.

Also, in order to move rearward with the traveling device 2, in opposite to that described above, the user grips and pulls the right gripping part 40 and the left gripping part 42 rearward as indicated by an arrow 76 while gripping the same. Pulling rearward as indicated by the arrow 76 in the resting state, then as shown in FIG. 7, the support body 4 floats upward with the right rear wheel 62 and the left rear wheel 64 of the rear wheel means 52 as pivot points, so a force pulling rearward moves the support body 4 rearward, moving the traveling device 2 rearward.

At this time, because the body weight of the user P acts on a part front of the rear wheel means 52, the support body 4 is returned to its initial state by the body weight of the user P. Thus, the traveling device 2 returns to its initial state, becoming the standstill state, after slightly moving rearward. Thus, each time the user P pulls rearward, the user P can move rearward a little, feeling safe.

Second Embodiment

Next, a traveling device according to a second embodiment of the present invention will be described with reference to FIG. 8. Note that in FIG. 8 the parts substantially the same as those of the above-described first embodiment will be assigned with the same numberings and detailed description thereof will be omitted.

Figure 8:
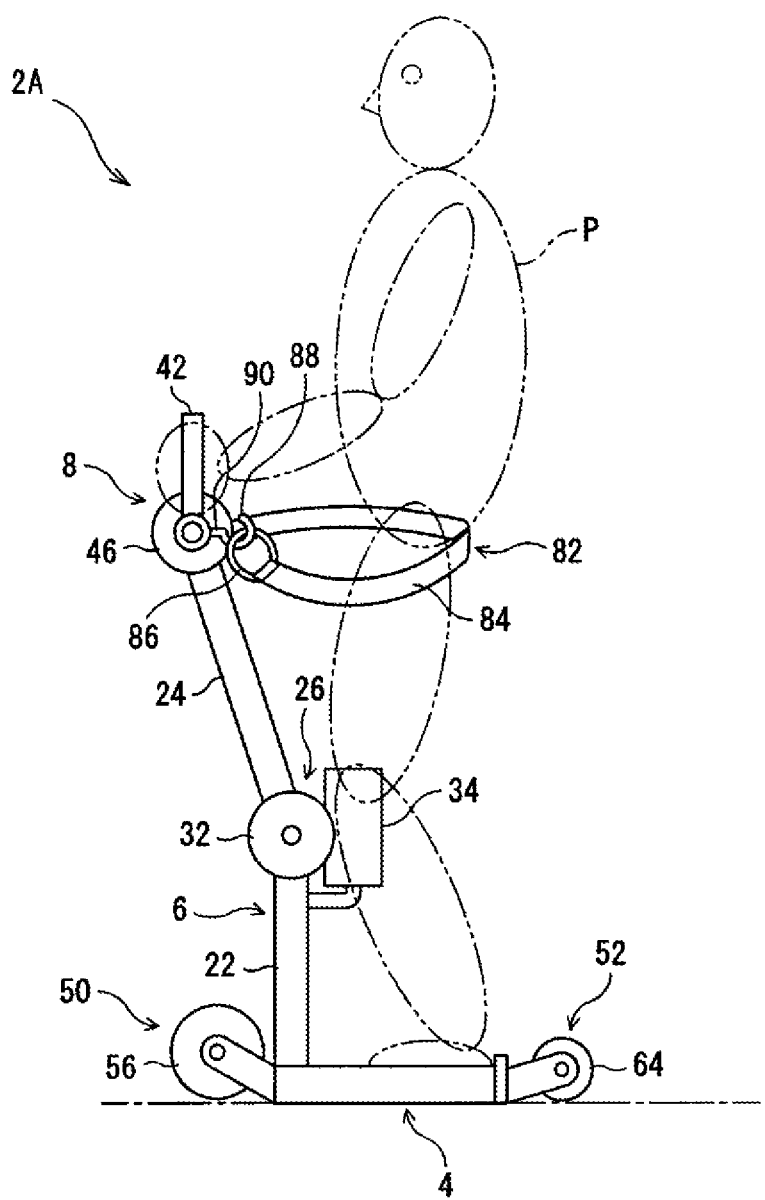
FIG. 8 is a side view of a traveling device according to a second embodiment of the present invention.

In FIG. 8, in this embodiment, a traveling device 2A is provided with a support belt 82 so that the user P can maintain in a standing position. The support belt 82 has a belt body 84, and ring-shaped metallic parts 86 (only one is shown in FIG. 8) are attached to both ends of the belt body 84. Also, in this embodiment, engaging metallic parts 90 (only one is shown in FIG. 8) each having a substantially C-shaped engaging part 88 are attached to the gripping section 8 side, more specifically to both ends of the horizontal gripping part 38. With this configuration, the support belt 82 can be freely detachably mounted to the gripping section 8 of the traveling device 2 by engaging one of the metallic parts 86 of the support belt 82 with the engaging part 88 of the engaging metallic part 90 at one side of the horizontal gripping part 38 and the other of the metallic parts 86 with the engaging part 88 of the engaging metallic part 90 at the other side of the horizontal gripping part 38, for example.

As shown in FIG. 8, the user P is positioned inside the mounted support belt 82, and the support belt 82 supports the buttocks of the user P. Supported in this manner, the user P is in a state in which the user P sits on the front edge of the support belt 82. Hence, the user P can maintain the standing position stably without gripping the gripping section 8.

Third Embodiment

Next, a traveling device according to a third embodiment of the present invention will be described. Note that the parts substantially the same as those of the traveling device 2 or 2A of the above-described first and second embodiments will be assigned with the same numberings and detailed description thereof will be omitted.

Figure 9:
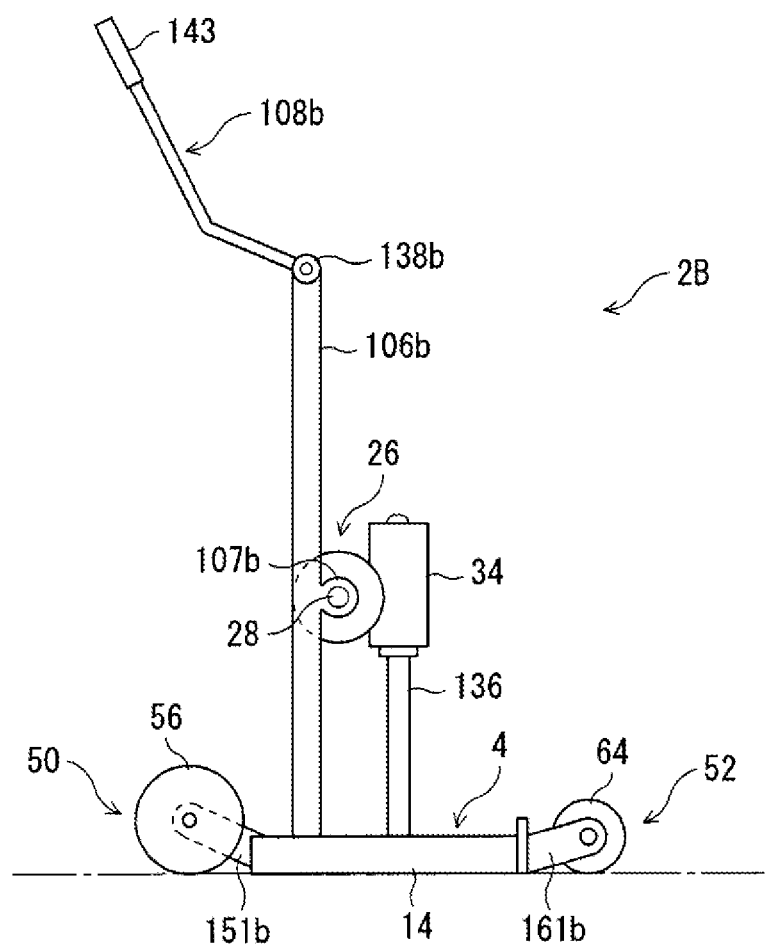
FIG. 9 is a side view of a traveling device according to a third embodiment of the present invention.
Figure 10:
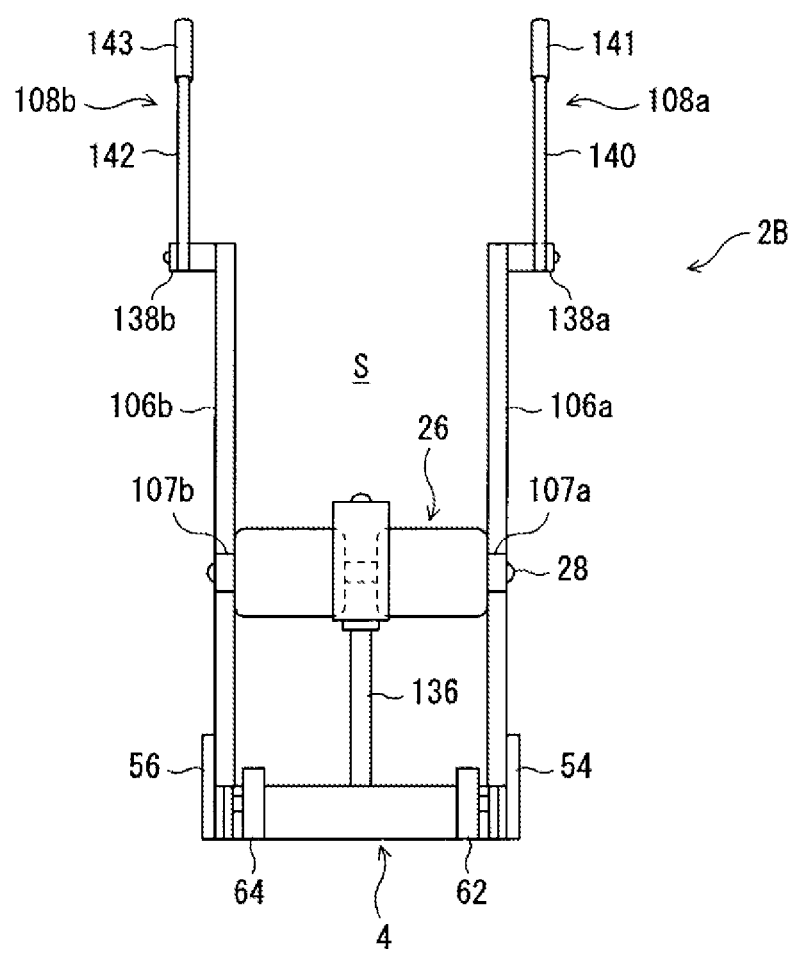
FIG. 10 is a rear view of the traveling device of FIG. 9, viewing the same from the rear.
Figure 11:
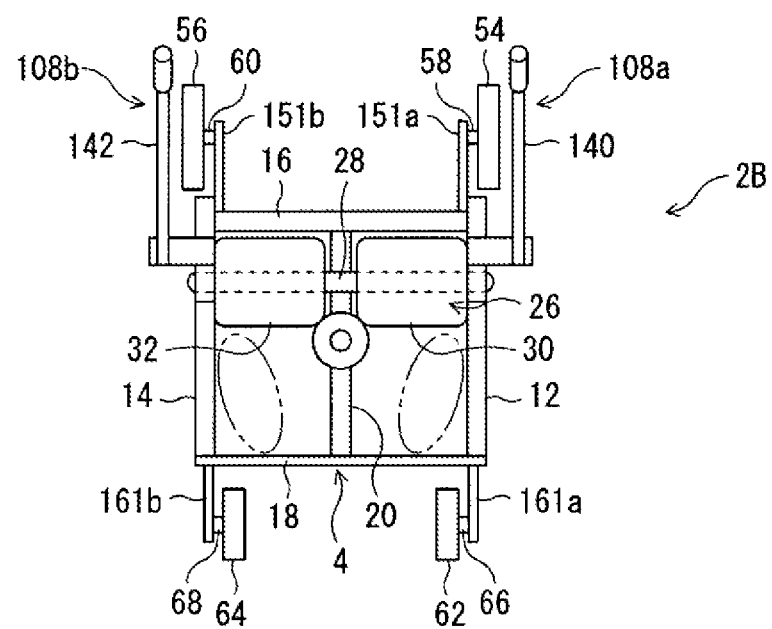
FIG. 11 is a plan view of the traveling device of FIG. 9, viewing the same from the top.

Referring to FIGS. 9 to 11, a traveling device 2B shown in the drawings includes a pair of columnar sections 106a and 106b extending upward from the support body 4. The columnar section 106a on the right side (right columnar section) is provided at the front side of the right side of the support body 4 (at the front side of the right-side plate 12, in this embodiment) and extends substantially upward in the vertical direction from the right-side plate 12. The columnar section 106b on the left side (left columnar section) is provided at the front side of the left side of the support body 4 (at the front side of the left-side plate 14, in this embodiment) and extends substantially upward in the vertical direction from the left-side plate 14.

In this embodiment, the middle abutting part 26 is provided to the columnar sections 106a and 106b. Specifically, the columnar sections 106a and 106b are provided with support parts 107a and 107b, respectively, that extend rearward from the middle parts thereof, and the middle shaft member 28 is provided penetrating through the support parts 107a and 107b. The right elastic member 30 is mounted on one side of the middle shaft member 28, and the left elastic member 32 is mounted on the other side thereof. With this configuration, a space S is defined above the middle abutting part 26 by upper parts of the columnar sections 106a and 106b and the middle abutting part 26.

Also, a support-shaft part 136 is provided so as to extend substantially upward in the vertical direction from a middle part of the middle reinforcing member 20, and the middle elastic member 34 is provided at the upper part of the support-shaft part 136.

A right gripping member 108a and a left gripping member 108b are provided at the top ends of the columnar sections 106a and 106b, respectively. The right gripping member 108a includes a right-horizontal part 138a fixed to the top of the columnar section 106a and extending in the horizontally outward direction (rightward) and a somewhat L-shaped right gripping part 140 extending upward toward the front at a slant from the right-horizontal part 138a. Similarly, the left gripping member 108b includes a left-horizontal part 138b fixed to the top of the columnar section 106b and extending in the horizontally outward direction (leftward) and a somewhat L-shaped left gripping part 142 extending upward toward the front at a slant from the left-horizontal part 138b.

Free ends of the right gripping part 140 and the left gripping part 142 are covered with cylindrical elastic members 141 and 143 serving as shock-absorbers. When gripping the right gripping part 140 and the left gripping part 142, the user P grips the sections of the right gripping part 140 and the left gripping part 142 covered with the elastic members 141 and 143.

A pair of support plates 151a and 151b extending forward is provided to both ends of the front reinforcing member 16 in the right-left direction. The right front wheel 54 is rotatably supported outer side of the support plate 151a through the support shaft 58, and the left front wheel 56 is rotatably supported outer side of the support plate 151b through the support shaft 60. Also, a pair of support plate 161a and 161b extending rearward is provided at the both ends of the rear-side plate 18 in the right-left direction. The right rear wheel 62 is rotatably supported inner side of the support plate 161a through the support shaft 66, and the left rear wheel 64 is rotatably supported inner side of the support plate 161b through the support shaft 68.

In this embodiment, the relationship between the support body 4 and the front wheel means 50 (the right and left front wheels 54 and 56) and the rear wheel means 52 (the right and left rear wheels 62 and 64) is set as follows. In the normal standstill state, as shown in FIG. 9, all of the bottom of the support body 4 (i.e., the bottom surface of the base plate 10), the front wheel means 50, and the rear wheel means 52 contact the ground, maintained in the resting state.

In order to move forward using the traveling device 2B, in the same manner as the above-described traveling device 2, the user grips and pushes the right gripping part 140 and the left gripping part 142 forward. In the normal standstill state (resting state), the bottom surface of the support body 4 (the bottom surface of the base plate 10), the front wheels 54 and 56 of the front wheel means 50, and the rear wheels 62 and 64 of the rear wheel means 52 contact the ground, being at a stop in a stable manner. By pushing frontward in this manner, however, the support body 4 and the rear wheels 62 and 64 of the rear wheel means 52 float upward with the right front wheel 54 and the left front wheel 56 of the front wheel means 50 as pivot points, so a force pushing forward moves the support body 4 forward, making the traveling device 2B move forward.

Also, in order to move rearward using the traveling device 2B, in the same manner as the above described traveling device 2, the user grips and pulls the right gripping part 140 and the left gripping part 142 rearward. By pulling rearward in this manner in the resting state, the support body 4 and the right front wheel 54 and the left front wheel 56 of the front wheel means 50 float upward with the right rear wheel 62 and the left rear wheel 64 of the rear wheel means 52 as pivot points, so a force pulling rearward moves the support body 4 rearward, making the traveling device 2B move rearward.

In this embodiment, because the space S is defined above the middle abutting part 26, the upper body of the user P can be prevented from abutting parts of the traveling device 2B when moving forward using the traveling device 2B, for example.

Fourth Embodiment

Next, a traveling device according to a fourth embodiment of the present invention will be described. Note that the parts substantially the same as those of the traveling device 2, 2A, or 2B of the above-described first, second, or third embodiment will be assigned with the same numberings and detailed description thereof will be omitted.

Figure 12:
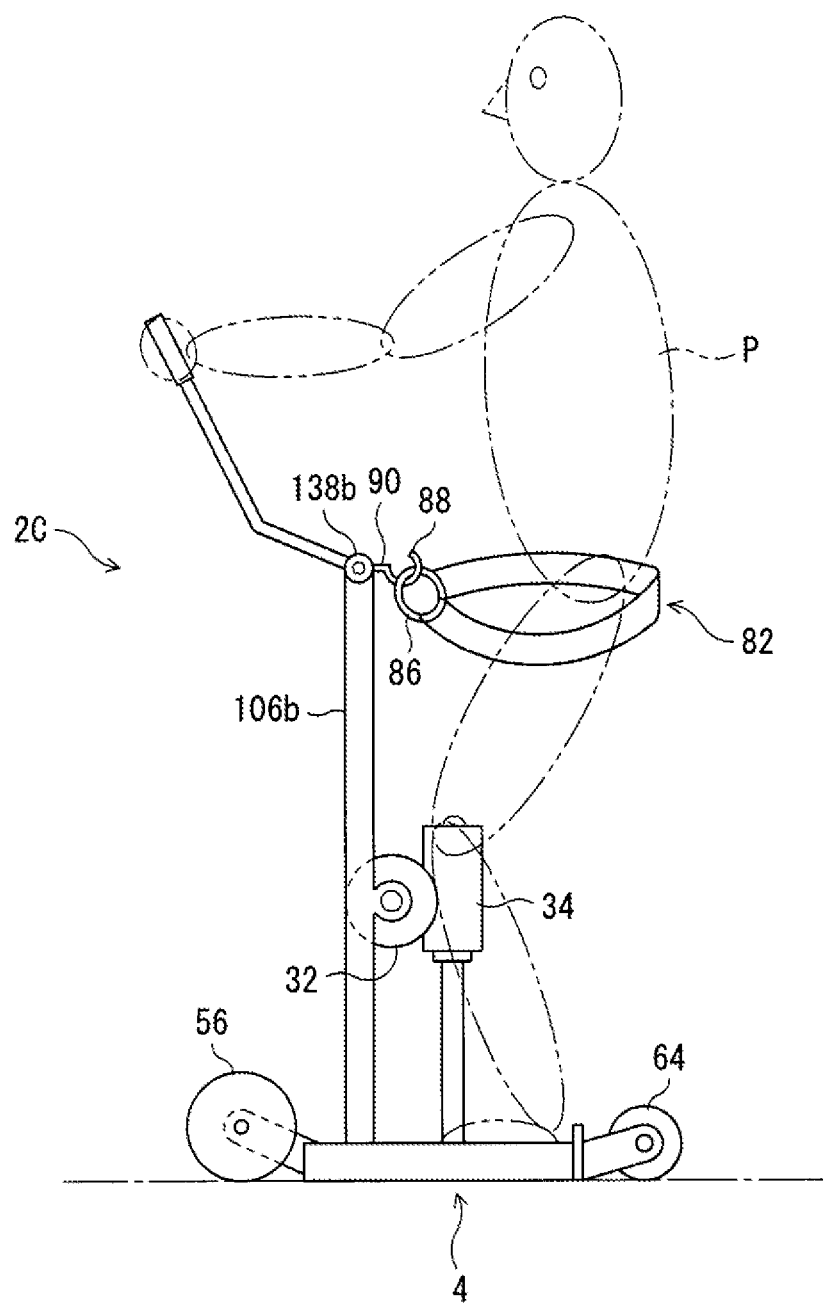
FIG. 12 is a side view of a traveling device according to a fourth embodiment of the present invention.

A traveling device 2C shown in FIG. 12 has substantially the same configuration as the traveling device 2B described above, but differs from the traveling device 2B in that the traveling device 2C is provided with the support belt 82 described above. In this embodiment, the engaging metallic parts 90 are attached to the right-horizontal part 138a and the left-horizontal part 138b of the gripping members 108a and 108b. One of the ring-shaped metallic parts 86 of the support belt 82 is engaged with the engaging part 88 of the engaging metallic part 90 of the right-horizontal part 138a, and the other of the ring-shaped metallic parts 86 is engaged with the engaging part 88 of the engaging metallic part 90 of the left-horizontal part 138b. With this configuration, the support belt 82 can be freely detachably mounted to the gripping members 108a and 108b of the traveling device 2C.

Fifth Embodiment

Next, a traveling device according to a fifth embodiment of the present invention will be described. Note that the parts substantially the same as those of the traveling device 2, 2A, 2B, or 2C of the above-described first to fourth embodiments will be assigned with the same numberings and detailed description thereof will be omitted.

Figure 13:
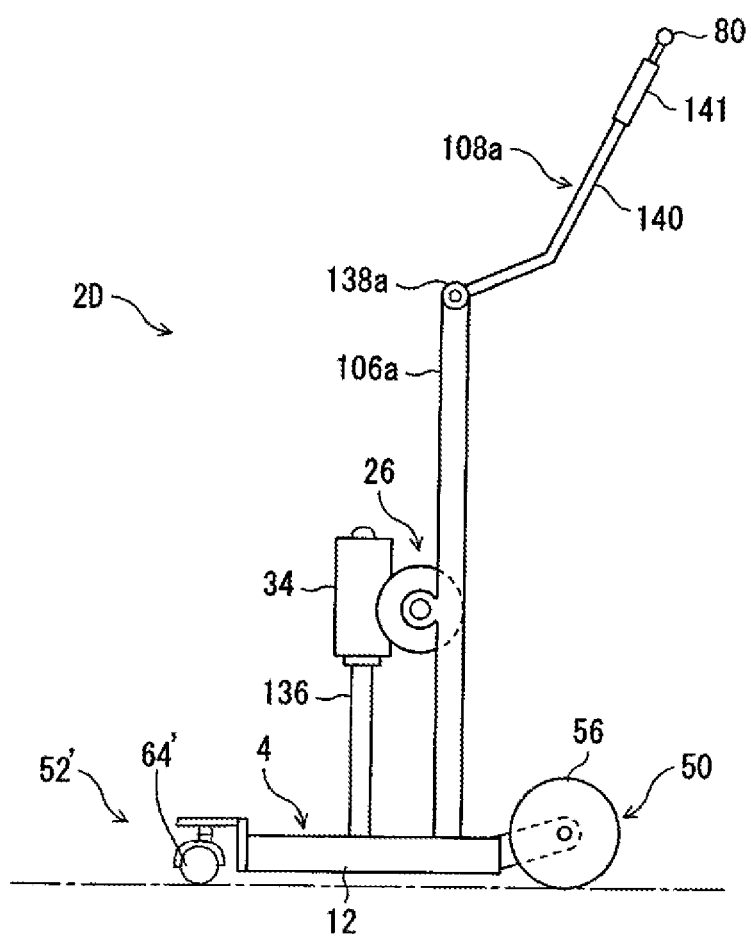
FIG. 13 is a side view of a traveling device according to a fifth embodiment of the present invention.
Figure 14:
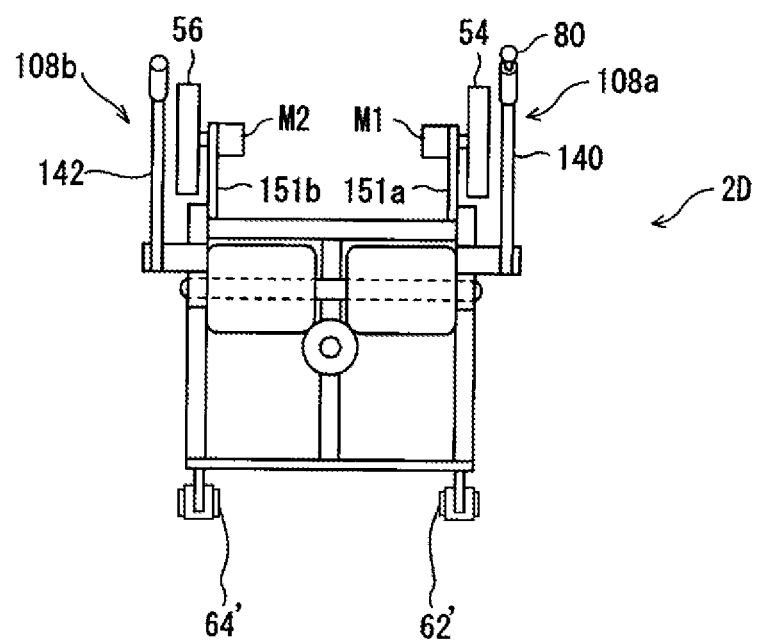
FIG. 14 is a plan view of the traveling device of FIG. 13, viewing the same from the top.
Figure 15:
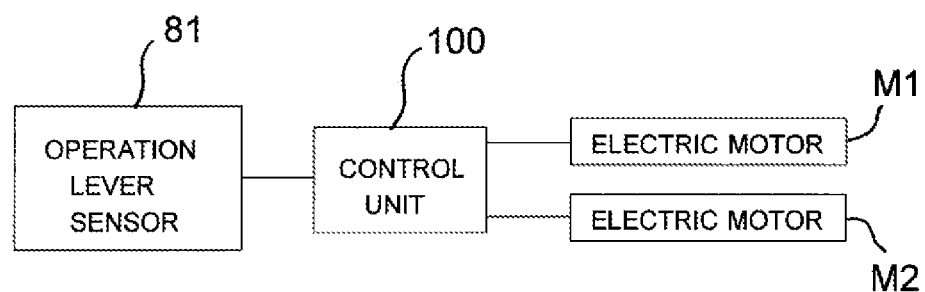
FIG. 15 is a block diagram of a control system of the traveling device of FIG. 13.

With reference to FIGS. 13 to 15, a traveling device 2D shown in the drawings has substantially the same configuration as the traveling device 2B described above, but differs from the traveling device 2B in the following points. That is, the traveling device 2D includes a rear wheel means 52' instead of the rear wheel means 52. The rear wheel means 52' has a right rear wheel 62' and a left rear wheel 64', each made of a caster wheel (free wheel with a revolving structure and a wheel). Also, the front wheel means 50 and the rear wheel means 52' contact the ground, and the bottom of the support body 4 (i.e., the bottom surface of the base plate 10) slightly and constantly floats off the floor surface, the ground surface, or the like. Further, electric motors M1 and M2 that drive in the forward and reverse directions are provided in relation to the front wheel means 50. The electric motor M1 has an output shaft coupled to the right front wheel 54 of the front wheel means 50, and the electric motor M2 has an output shaft coupled to the left front wheel 56 of the front wheel means 50.

An operation lever 80 serving as an operation means is provided at the free end of the right gripping part 140. The operation lever 80 is configured to be operable in the front-rear direction and the right-left direction about a predetermined position. Also, an operation lever sensor 81 is provided in relation to the operation lever 80. The operation lever sensor 81 detects an operation direction in which the operation lever 80 is operated by the user P. A control unit 100 controls the electric motors M1 and M2 according to an input signal from the operation lever sensor 81. Specifically, the control unit 100 drives the electric motors M1 and M2 in a predetermined direction if the operation direction of the operation lever 80 is forward direction, and drives the electric motors M1 and M2 in a reverse direction if rearward direction. The control unit 100 only drives the electric motor M1 on the right side in the predetermined direction if the operation direction of the operation lever 80 is leftward direction, and only drives the electric motor M2 on the left side in the predetermined direction if rightward direction. Further, when the operation lever 80 is at the predetermined position (not operated neither in the front-rear direction nor in the right-left direction), then both the electric motors M1 and M2 are in a halt state.

With this configuration, if the user P operates the operation lever 80 toward the front, then the front wheels 54 and 56 are driven to rotate in the predetermined direction by the electric motors M1 and M2, moving the traveling device 2D forward. On the other hand, if the user P operates the operation lever 80 toward the rear, then the front wheels 54 and 56 are driven to rotate in the reverse direction by the electric motors M1 and M2, moving the traveling device 2D rearward. Also, if the user P operates the operation lever 80 toward the left, then the right front wheel 54 is driven to rotate in the predetermined direction by the electric motor M1 on the right side. At this time, the electric motor M2 on the left side is maintained in a halt state, so the traveling device 2D moves in a counterclockwise direction in a plan view, thereby turning the traveling device 2D to the left. Similarly, if the user P operates the operation lever 80 toward the right, then the left front wheel 56 is driven to rotate in the predetermined direction by the electric motor M2 on the left side. At this time, the electric motor M1 on the right side is maintained in a halt state, so the traveling device 2D moves in a clockwise direction in a plan view, thereby turning the traveling device 2D to the right. Also, returning the operation lever 80 to the predetermined position stops the rotation of the electric motors M1 and M2.

As described above, according to the present embodiment, it is possible to move the traveling device 2D forward or rearward using the electric motors M1 and M2 without using the pushing force or pulling force of the user P. Also, the traveling device 2D can be easily turned to the right or left by controlling the electric motors M1 and M2. Further, because the right rear wheel 62' and the left rear wheel 64' formed of casters can revolve following the movement of the traveling device 2D, direction of the traveling device 2D can be changed smoothly.

While the invention has been described in detail with reference to the embodiments thereof, it would be apparent to those skilled in the art that various changes and modifications may be made therein without departing from the spirit of the invention.

For example, the right elastic member 30, the left elastic member 32, and the middle elastic member 34 may be configured such that their positions can be adjusted in the height direction so as to match the height of the user P. The lower columnar part 22 of the first and second embodiments and the columnar sections 106a and 106b and the support-shaft part 136 of the third to fifth embodiments may be formed adjustable in their positions with respect to the height direction.

Also, in the above-described first and second embodiments, for example, the pushing force of the user P is used to move forward, and the pulling force is used to move rearward. Instead of adopting this configuration, however, it may be configured to move forward or rearward using electric power. In this case, the front wheel means 50 (the front wheels 54 and 56) and the rear wheel means 52 (the rear wheels 62 and 64) may be configured to be movable between a traveling position to contact the ground and a non-traveling position shifted upward from the traveling position, and this movement may be realized using a cylinder mechanism, for example, and an electric motor that devices in the forward and reverse directions may be provided in relation to the front wheel means 50 (and/or the rear wheel means 52). Then, in the standstill state, the front wheel means 50 and the rear wheel means 52 are maintained at the non-traveling position, wherein the bottom surface of the support body 4 contacts the ground while the front wheel means 50 and the rear wheel means 52 are maintained in the floating state. Also, in the traveling state, the front wheel means 50 and the rear wheel means 52 are maintained at the traveling position, wherein the front wheel means 50 and the rear wheel means 52 contact the ground, and the support body 4 is maintained in the floating state. In this state, if the electric motor is driven in the forward direction, for example, then the front wheel means 50 (and/or the rear wheel means 52) is driven to rotate in the predetermined direction. As a result, the support body 4 travels forward. On the other hand, if the electric motor is driven in the reverse direction, for example, then the front wheel means 50 (and/or the rear wheel means 52) is driven to rotate in a direction opposite from the predetermined direction. As a result, the support body 4 travels rearward.

In the fifth embodiment, the front wheel means 50 (the front wheels 54 and 56) and the rear wheel means 52' (the rear wheels 62' and 64') may be configured to be movable between an electrically travelling position in which the support body 4 is floating upward and a non-electrically travelling position in which the support body 4 contacts the ground (same configuration as the second embodiment), and this movement may be realized using a cylinder mechanism, for example. In this case, in the normal state, the front wheel means 50 and the rear wheel means 52' are maintained in the electrically travelling position, and the bottom surface of the support body 4 is maintained in the floating state. In a non-electrically travelling state, the front wheel means 50 and the rear wheel means 52' are maintained in the non-electrically traveling position, and the support body 4, the front wheel means 50, and the rear wheel means 52' contact the ground. The traveling device travels forward or rearward using the electric motors M1 and M2 in the normal state as described above, and is moved forward with the pressing force applied by the user P or rearward with the pulling force in the non-electrically travelling state as in the second embodiment. Also, a switch (not shown) for controlling the cylinder mechanism to switch between the electrically traveling position and the non-electrically traveling position may be provided at the free end of the left gripping part 142, for example. Further, the operation lever 80 may be provided at other than the free end of the right gripping part 140, such as the free end of the left gripping part 142. In this case, the switch (not shown) for switching between the electrically traveling position and the non-electrically traveling position may be provided at the free end of the right gripping part 140, for example.

The support belt 82 described above may be provided to the traveling device 2D of the fifth embodiment. Also, a speed control switch may be provided to the traveling device 2D for controlling the rotation speed of the electric motors M1 and M2. This makes it possible to control the traveling speed of the traveling device 2D. Although the electric motors M1 and M2 are provided in relation to the front wheel means 50 in the fifth embodiment described above, the electric motors M1 and M2 may be provided in relation to the rear wheel means 52.

In the above-described first and second embodiments, the traveling devices 2 and 2A are configured such that the bottom surface of the support body 4 contacts the ground and the front wheel means 50 and the rear wheel means 52 are maintained in the floating state in the standstill state. Instead of this configuration, they may be configured such that all of the bottom surface of the support body 4, the front wheel means 50, and the rear wheel means 52 contact the ground as in the third embodiment.

Also, in the above-described third and fourth embodiments, the traveling devices 2B and 2C are configured such that the bottom surface of the support body 4, the front wheel means 50, and the rear wheel means 52 are maintained in contact with the ground in the standstill state. Instead of this configuration, they may be configured such that the bottom surface of the support body 4 contacts the ground and that the front wheel means 50 and the rear wheel means 52 are maintained in the floating state as in the first embodiment.

EXPLANATION OF REFERENCE NUMBERS 2, 2A, 2B, 2C, 2D traveling device
4 support body
6, 106a, 106b columnar section
8, 108a, 108b gripping section
10 base plate
12 right-side plate (right-outer abutting part)
14 left-side plate (left-outer abutting part)
18 rear-side plate (right and left rear abutting parts)
28 middle shaft member (right and left middle abutting parts)
30, 32, 34 elastic member
50 front wheel means
52, 52' rear wheel means
80 operation lever
M1, M2 electric motor

What is claimed is:

1. A traveling device comprising:
a support body;
a columnar section extending upward from the support body;
a gripping section provided at an upper part of the columnar section, the gripping section having a right gripping part and a left gripping part;
a middle abutting part provided in a middle of the columnar section; and
a middle elastic member, wherein:
the support body includes a right support part that supports a right foot of a user and a left support part that supports a left foot of the user, the right support part being provided with a right-rear abutting part at a rear part thereof, the left support part being provided with a left-rear abutting part at a rear part thereof, the right-rear abutting part restricting rearward movement of a right heel of the user, the left-rear abutting part restricting rearward movement of a left heel of the user;
the middle abutting part extends in a horizontal direction and is provided with a right-middle abutting part at a first side and a left-middle abutting part at a second side, the right-middle abutting part being covered with a right cylindrical elastic member and restricting forward movement of a patellar ligament or a shin bone of a right leg of a user, the left-middle abutting part being covered with a left cylindrical elastic member and restricting forward movement of a patellar ligament or a shin bone of a left leg of the user;
the middle elastic member is provided between the right elastic member and the left elastic member and supports the right knee and the left knee of the user;
the right-rear abutting part, the left-rear abutting part, the right-middle abutting part, and the left-middle abutting part together enable the user to stand by restricting the rearward movement of the right heel and the left heel and the forward movement of the patellar ligaments or the shin bones of the right leg and the left leg; and
in order for the user to ride onto the support body, the user, from a sitting position, (i) places the right foot on the right support part such that the right heel abuts against the right-rear abutting part, (ii) places the left foot on the left support part such that the left heel abuts against the left-rear abutting part, (iii) abuts the patellar ligament or the shin hone of the right leg against the right elastic member, (iv) abuts a right knee against a right side of the middle elastic member, (v) abuts the patellar ligament or the shin bone of the left leg against the left elastic member, (vi) abuts a left knee against a left side of the middle elastic member, and grips the right gripping part and the left gripping part with a right hand and a left hand, and then (vii) stands up by lifting up a user's body using arm strength with the right-rear abutting part, the left-rear abutting part, the right-middle abutting part, and the left-middle abutting part restricting the rearward movement of the right heel and the left heel and the forward movement of the patellar ligaments or the shin hones of the right leg and the left leg.

2. The traveling device according to claim 1, wherein the middle elastic member is formed cylindrical, and in use, the right knee and the left knee of the user abut against a peripheral surface of the middle elastic member.

3. The traveling device according to claim 1, wherein: the right support part is provided with a right-outer abutting part; the left support part is provided with a left-outer abutting part; and in use, an outer side of the right foot of the user abuts against the right-outer abutting part, and an outer side of the left foot abuts against the left-outer abutting part.

4. The traveling device according to claim 1, wherein a front wheel means is provided at a front side of the support body, and a rear wheel means is provided at a rear side of the support body.

5. The traveling device according to claim 4, wherein:
the support body has a base plate;
the front wheel means and the rear wheel means are positioned slightly higher than a bottom surface of the base plate;
as long as the bottom surface of the support body contacts the ground, the traveling device is maintained in a standstill state and the front wheel means and the rear wheel means are maintained in a floating state;
when the right gripping part and the left gripping part are gripped and pushed forward in the standstill state, then the base plate floats upward about the front wheel means, moving the support body forward; and
when the right gripping part and the left gripping part are gripped and pulled rearward in the standstill state, then the base plate floats upward about the rear wheel means, moving the support body rearward.

6. The traveling device according to claim 5, wherein:
the front wheel means and the rear wheel means are freely movable between a traveling position lower than a bottom surface of the base plate and a non-traveling position higher than the bottom surface of the base plate;
in the standstill state, the front wheel means and the rear wheel means are maintained at the non-traveling position, and the bottom surface of the base plate contacts the ground; and
in a traveling state, the front wheel means and the rear wheel means are maintained at the traveling position to contact the ground, and the base plate is maintained in the floating state.

7. The traveling device according to claim 5, wherein after the support body is moved forward, a body weight of the user acting on a part rear of the front wheel means automatically returns the support body to an initial state where the bottom surface of the base plate contacts the ground to restore the standstill state.

8. The traveling device according to claim 4, wherein:
an electric motor is provided in relation to any of the front wheel means and the rear wheel means;
a bottom surface of the support body is positioned slightly higher than the front wheel means and the rear wheel means;
the support body moves forward when any of the front wheel means and the rear wheel means is driven to rotate in a predetermined direction by the electric motor; and
the support body moves rearward when any of the front wheel means and the rear wheel means is driven to rotate in a reverse direction by the electric motor.

9. The traveling device according to claim 8, further comprising an operation means used for controlling the electric motor, a right gripping part that is gripped with a right hand of the user, and a left gripping part that is gripped with a left hand of the user, wherein the operation means is provided at the right gripping part or the left gripping part and operated by the user.

10. The traveling device according to claim 1, wherein:
the gripping section has a horizontal gripping part fixed to the columnar section and extending in the horizontal direction; and
the horizontal gripping part is provided with a right gripping part at one side and a left gripping part at the other side.

11. The traveling device according to claim 10, wherein a support belt is detachably attached between both sides of the gripping section, and the support belt supports buttocks of the user.

12. The traveling device according to claim 1, wherein:
the columnar section includes a right columnar section and a left columnar section; and
a space is defined at a position above the middle abutting part by the middle abutting part and upper parts of the right columnar section and the left columnar section.

13. The traveling device according to claim 12, wherein:
the gripping section includes a right gripping member provided at an upper part of the right columnar section and a left gripping member provided at an upper part of the left columnar section;
the right gripping member includes a right-horizontal part fixed to the right columnar section and extending in the horizontal direction and the right gripping part extending upward toward the front at a slant from the right-horizontal part; and
the left gripping member includes a left-horizontal part fixed to the left columnar section and extending in the horizontal direction and the left gripping part extending upward toward the front at a slant from the left-horizontal part.

14. The traveling device according to claim 13, wherein:
a front wheel means is provided at a front part of the support body;
a rear wheel means is provided at a rear part of the support body;
in a standstill state, the front wheel means, the rear wheel means, and a bottom surface of the support body contact the ground;
when the right gripping part and the left gripping part are gripped and pushed forward in the standstill state, the support body and the rear wheel means float upward about the front wheel means, moving the support body forward; and
when the right gripping part and the left gripping part are gripped and pulled rearward in the standstill state, the support body and the front wheel means float upward about the rear wheel means, moving the support body rearward.

15. The traveling device according to claim 13, wherein:
the support body has a base plate;
a front wheel means is provided at a front part of the support body;
a rear wheel means is provided at a rear part of the support body;
the front wheel means and the rear wheel means are at positions slightly higher a bottom surface of the base plate;
as long as the bottom surface of the base plate contacts the ground, the traveling device is maintained in a standstill state and the front wheel means and the rear wheel means is maintained in a floating state;
when the right gripping part and the left gripping part are gripped and pushed forward in the standstill state, the base plate floats upward about the front wheel means, moving the support body forward; and
when the right gripping part and the left gripping part are gripped and pulled rearward in the standstill state, the base plate floats upward about the rear wheel means, moving the support body rearward.

16. The traveling device according to claim 13, wherein a support belt is detachably attached to the right gripping part and the left gripping part, and the support belt supports buttocks of the user.

* * * * *